United States Patent [19]

Cooke, Jr. et al.

[11] 4,068,718
[45] Jan. 17, 1978

[54] HYDRAULIC FRACTURING METHOD USING SINTERED BAUXITE PROPPING AGENT

[75] Inventors: Claude E. Cooke, Jr., Houston, Tex.; Walter A. Hedden, Worthington; William C. Chard, Columbus, both of Ohio

[73] Assignee: Exxon Production Research Company, Houston, Tex.

[21] Appl. No.: 735,565

[22] Filed: Oct. 26, 1976

Related U.S. Application Data

[63] Continuation of Ser. No. 617,253, Sept. 26, 1975, abandoned, which is a continuation-in-part of Ser. No. 471,098, May 17, 1974, abandoned.

[51] Int. Cl.² ............................................. E21B 43/26
[52] U.S. Cl. ................................ 166/280; 166/307; 166/308
[58] Field of Search .................. 166/280, 307, 308; 425/6

[56] References Cited
U.S. PATENT DOCUMENTS

| | | | |
|---|---|---|---|
| 2,950,247 | 8/1960 | McGuire et al. | 166/280 |
| 2,962,095 | 11/1960 | Morse | 166/280 |
| 3,075,581 | 1/1963 | Kern | 166/280 |
| 3,155,159 | 11/1964 | McGuire et al. | 166/280 |
| 3,237,693 | 3/1966 | Huitt et al. | 166/280 |
| 3,241,613 | 3/1966 | Kern et al. | 166/280 |
| 3,323,594 | 6/1967 | Huitt et al. | 166/280 |
| 3,387,888 | 6/1968 | Shock et al. | 166/280 |
| 3,399,727 | 9/1968 | Graham et al. | 166/280 |
| 3,437,148 | 4/1969 | Colpoys | 166/280 |
| 3,497,008 | 2/1970 | Graham et al. | 166/280 |
| 3,890,072 | 6/1975 | Barks | 425/6 |

OTHER PUBLICATIONS

"The Condensed Chemical Dictionary", Sixth Edition, 1964, pp. 47, 51 and 52.

*Primary Examiner*—Stephen J. Novosad
*Attorney, Agent, or Firm*—Salvatore J. Casamassima; Robert L. Graham

[57] ABSTRACT

An improved method of fracturing a subterranean formation wherein particles composed of sintered bauxite are placed in the formation fracture to maintain the walls of the fracture spaced apart. The sintered bauxite particles have a specific gravity greater than 3.4 and are prepared from bauxite material having a grain size of about 12 microns or less.

15 Claims, 1 Drawing Figure

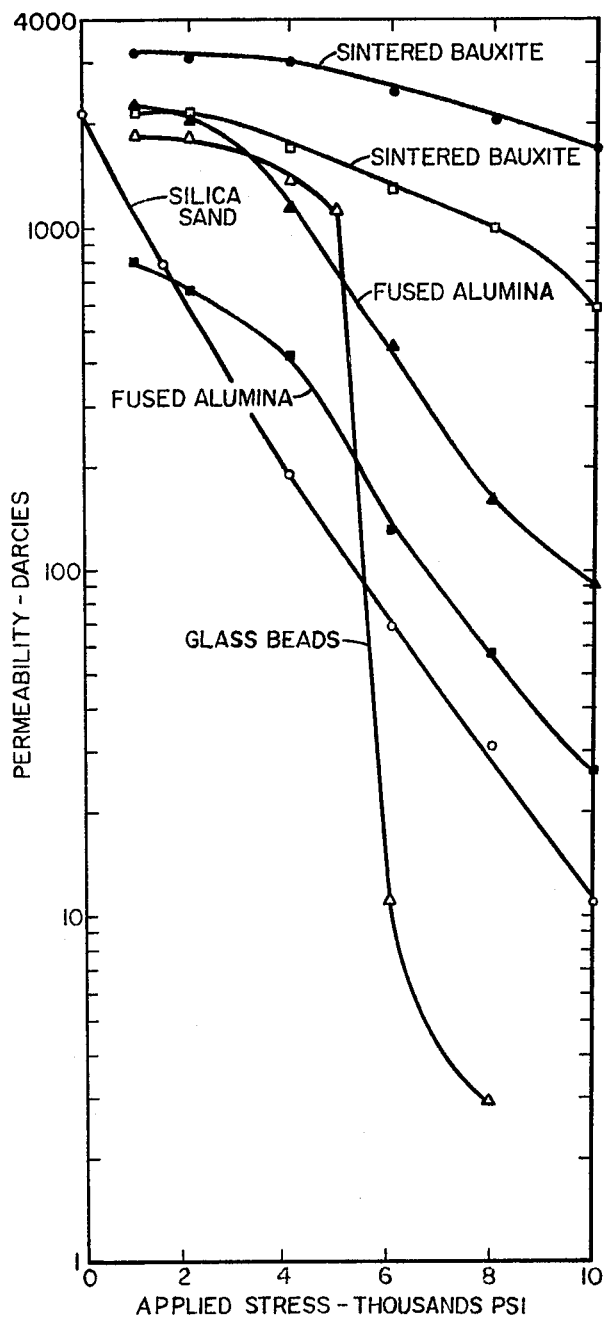

HYDRAULIC FRACTURING METHOD USING SINTERED BAUXITE PROPPING AGENT

CROSS REFERENCES TO RELATED APPLICATIONS

This application is a continuation of application Ser. No. 617,253, filed Sept. 26, 1975, now abandoned, which is a continuation-in-part of application Ser. No. 471,098, filed May 17, 1974, now abandoned.

BACKGROUND OF THE INVENTION

1. Field of the Invention

This invention relates to a method of fracturing subterranean formations surrounding oil wells, gas wells, and similar boreholes. In one aspect the invention relates to a method which employs sintered bauxite particles for maintaining a fracture in a subterranean formation in a propped condition.

2. Description of the Prior Art

Hydraulic fracturing is a well stimulation technique designed to increase the productivity of a well by creating highly conductive fractures or channels in the producing formation surrounding the well. The process normally involves two basic steps: (1) injecting a fluid at sufficient rate and pressure to rupture the formation thereby creating a crack (fracture) in the reservoir rock, and (2) thereafter placing a particulate material (propping agent) in the formation to maintain the fracture walls open by resisting forces tending to close the fracture. If stimulation is to occur, the propping agent must have sufficient mechanical strength to bear the closure stresses and provide relatively high permeability in the propped fracture.

Although a variety of particulate materials have been proposed for use as proppants, silica sand remains the only material that is used extensively. It has been long recognized, however, that sand is not the ideal proppant. Sand at closure stresses encountered in deep formations tends to disintegrate, producing fines or fragments which can drastically reduce permeability of the propped fracture.

Efforts to develop a proppant capable of bearing high stresses without excessive fragmentation have produced such material as glass beads, steel shot, and aluminum pellets. These materials, however, are quite expensive and therefore have not been widely used. The cost of proppant can best be appreciated when realizing that a typical fracturing treatment uses 30,000 pounds of proppant. High strength proppants such as glass beads currently cost from 10 to 20 times more than sand. This price can be justified only in deep wells where low priced proppants cannot bear the high stress levels. However, many of the available high strength proppants have not proven satisfactory for deep wells. Multilayers of glass beads, for example, at high stress levels under reservoir conditions do not provide high fracture permeability. Steel shot and aluminum pellets are susceptible to corrosion by formation brine.

U.S. Pat. No. 3,399,727 discloses the use of propping agent particles composed of ceramics having internal voids. These particles, preferably made by the evolution of gas bubbles within a molten ceramic (e.g. glass, porcelain or alumina), are designed to have partial crushability characteristics. According to the patent, the slow settling rate resulting from the low density particles and the partial crushability features make the proppants suitable for partial monolayer propping. However, such particles, because of their cellular structure and partial crushing characteristics, do not have sufficient compressive strength to withstand high stresses encountered in deep well fractures. Note that U.S. Pat. No. 3,399,727 states the voids reduce compressive strength and are useful at usual stress levels.

In summary, proppants for deep wells must possess sufficiently high compressive strength to avoid excessive fragmentation. They should also be inert to fluids injected into wells and reasonably priced.

SUMMARY OF THE INVENTION

The present invention provides a method which employs improved propping agent particles that are particularly suited for deep, high stress formations.

In the method, a fracture generated in a subterranean formation by the application of hydraulic force is propped with the improved propping agent composed of high density, fine grained sintered bauxite material. The sintered particles possess excellent compressive strength, are inert to formation fluids and can be packed in multilayers.

Sintered bauxite is a polycrystalline material made primarily from finely divided natural bauxite. The sintering process for producing the proppant is controlled such that most of the crystals in the final product are finer than about 25 microns and have a specific gravity greater than about 3.4, preferably between about 3.5 and 3.8. Sintered bauxite, having a specific gravity below 3.4, is difficult to produce and, because of the high void concentration would likely result in a product having low compressive strength. The sintered bauxite particles should be prepared from a fine grained bauxite material having a grain size of about 12 microns or less.

Laboratory tests have shown that multilayers of fine grained sintered bauxite particles provide higher permeability under stress than other materials proposed for propping agents which include sand, glass beads, and fused alumina. The reasons for the improved results are not fully understood but are believed to involve, at least in part, the small grain size of the low porosity sintered product and its polycrystalline structure. Natural bauxite normally contains a variety of materials including silicon oxide, iron oxide, titanium oxide, aluminum oxide, calcium oxide, magnesium oxide, and sodium oxide in varying degrees. The grain boundaries in the sintered particle are important. When stress is applied it is believed that the grains move along these boundaries, thus deforming and altering the load on the particle. This decreases stress concentration on the particle and minimizes fragmentation. Monocrystalline or large crystal structures such as sand or corrundum do not contain small grains (i.e., they are not polycrystalline) and, therefore, are more brittle. It is known that these brittle materials do not deform sufficiently under load, but instead disintegrate catastrophically as a result of high stress concentration at the point contacts between particles. Other mechanisms may be involved which account for the superior performance of the sintered bauxite particles, but the small grain size and the slightly deformable behavior of the sintered bauxite are believed to be major contributing factors.

The improved sintered particles can be made from natural bauxite, with the result that the final propping agent is less expensive than many other aluminum or alumina products. Bauxite, unlike alumina, contains naturally occurring impurities and does not require the addition of sintering agents. It produces high-strength sintered particles which are significantly less expensive than sintered alumina. The features of low cost in comparison to sintered alumina and high strength make sintered bauxite particularly well suited in deep well fracturing operations.

DESCRIPTION OF THE DRAWING

The drawing is a plot of stress versus permeability for various proppants tested under laboratory conditions.

DESCRIPTION OF THE PREFERRED EMBODIMENTS

Propping agents for use in the present invention may be prepared from natural bauxite. Bauxite is a natural ore consisting mainly of alumina ($Al_2O_3$) and containing various impurities including iron oxide, aluminum silicate, titanium dioxide, quartz, and components of phosphorus and vanadium. The term as used herein refers to rocks of mineral deposits in which alumina predominates. Sintering of bauxite is a process by which particles in the natural ore are sized, compacted, and welded together at temperatures below the melting point of the material. By properly processing the bauxite ore and controlling the sintering process, particles of the desired size, shape, and strength can be obtained.

In the manufacture of the propping agent, it is preferred that the bauxite ore be first ground to a fine powder, compacted, and then sintered at conditions to produce a limited grain growth. The particle size distribution should fall in the 3 to 25 micron range and the particles should have a specific gravity greater than about 3.4. A preferred specific gravity range is from about 3.5 to about 3.8. It appears that high density, fine grain particles have higher compressive strength than sintered large grain particles.

It is also preferred that the propping agent particles be well rounded or spherical in shape. Well rounded particles are subjected to less interparticle stress when packed in multilayers and are less apt to bridge within the well perforations or formation fracture than angular particles. The sintering process can be controlled to produce generally spherical particles or the final product can be processed to produce a well rounded configuration.

A preferred propping agent for use in the present invention is a sintered bauxite sold by Norton Company under the trademark "Alundum 75." This material has the following typical chemical analysis:

Aluminum Oxide: 85.14%
Titania: 4.55%
Silica: 2.82%
Zirconia: 0.16%
Iron oxide: 6.89%
Maganese oxide: 0.01%
Calcium oxide: 0.21%
Magnesia: 0.22%

"Alundum 75" is prepared by first subjecting the natural bauxite ore to preliminary calcination, grinding and sizing the ore to the proper powder size, compacting the powder at high pressure into agglomerated rounded masses of the generally desired sizes (e.g. 6 to 80 mesh), and finally subjecting the agglomerated masses to an elevated temperature to sinter the powder grains together. The initial particle crystal size is obtained by crushing the ore followed by screening and ball milling to obtain a particle size distribution ranging from about 1 micron to about 12 microns with the average particle size being about 4 to 5 microns. The agglomeration step is performed by compacting the powder and subjecting it to a high pressure, usually about 5,000 psi. The compacted agglomerations may be made in propping agent sizes. Specific gravity of "Alundum 75" is about 3.7.

The sintering process welds the fine grains together in the areas of contact. Although the sintering process is not fully understood, it is generally conceded that the driving force is the surface energy which decreases as a result of surface area decreasing during the sintering process. Because of the tendency of the material to reduce in surface area, the discrete powder particles grow together during the sintering process. Although the grain growth is referred to variously as recrystallization, or crystal growth, the mechanism herein will be referred to as simply "grain growth."

Also usable in the present invention is sintered bauxite particles sold by General Abrasive Company under the tradename SA Lionite. These sintered bauxite particles are prepared from calcined bauxite by the so-called "wet process." The bauxite ore after being subjected to a calcination step is sized by screening and crushing to produce fine powder. A slurry of the powdered bauxite and water solution is passed through a ball mill to further reduce the powder fineness (usually to a particle size less than about 7 microns). The slurry then is transferred to a conveyor and passed through a drier. This produces a coherent plate-like cake having a thickness about equal to one dimension of the finished particle. The dried cake is then broken into generally cubical or cubiform particles. After being screened to the proper size, the particles are sintered in a suitable kiln at conditions to produce strong generally cubicle polycrystalline particles composed of grains sintered together. Most of the grains are finer than 25 microns with the average grain size being between about 4 and 15 microns. Specific gravity of SA Lionite is about 3.75.

The shape of sintered bauxite particles may be made more spherical by several means. For example, the mass of powder can be rolled before sintering to make essentially spherical particles or the particles after sintering can be made more spherical by fluidizing and agitating the particles.

The starting materials, in addition to bauxite, may include other materials such as silica, pure alumina and the like. These materials in particulate form may be mixed with the bauxite prior to the sintering step. As used herein, however, the term bauxite material includes bauxite or bauxite mixtures in which bauxite is the principal ingredient.

The methods for sintering natural bauxite or bauxite mixtures are well known and are discussed in length in the literature. See for example, U.S. Pat. Nos. 3,079,243 and 3,491,492.

The final particle size of the sintered product is normally slightly smaller than the agglomerated masses before sintering. The amount of shrinkage depends in part on the materials employed and the sintering techniques, but normally is between about 10 and 20 percent. The final product can be classified according to particle size to produce a proper size range for fracturing operations. Size ranges typically employed in fracturing are 8–12 mesh, 10–20 mesh, 20–40 mesh, and 40–60 mesh.

Since the degree of stimulation attainable by hydraulic fracturing is dependent upon the conductivity of the propped fracture, measurement of compressive strength of the material alone is not sufficient to adequately evaluate proppants. A more realistic test involves measuring permeability of the proppant when stress is applied. Stress in the earth exerted on the proppant is commonly up to 0.7 psi per foot of depth, and frequently is much greater. The severity of the propping condition in deep wells is not only a result of increased stress or overburden pressure but also high temperature. Tests have illustrated that the fluid in contact with the proppant can also have a dramatic effect on permeability at high stress levels, particularly at temperatures normally encountered in deep wells. For example, when brine was flowed through multilayers of proppants, the permeability was much lower than when oil was used. Glass beads were found to be highly susceptible to brine, showing a marked decrease in permeability at stress levels above about 5000 psi. Based upon a gradient of 0.7 psi per foot, this stress level corresponds to a well depth in excess of about 7150 feet. The tests and test results are discussed at length in a paper by C. E. Cooke, Jr., published in *Journal of Petroleum Technology*, Sept., 1973, pp. 1101–1107.

The test procedures and apparatus employed to test the materials of the present invention and certain prior art proppants was similar to that described in the paper noted above. Each test sample was placed in a multilayer pattern in a pressure cell which included two platens for applying a controlled stress. The platens were equipped with means for maintaining the desired temperature during the test. Brine was flowed through the packed cell and the permeability determined at various stress levels and temperatures to determine the effect of temperature. The materials, material description, test conditions, and test results are presented in Table I.

incurred no greater than about a three-fourths reduction in permeability over that pressure range. By comparison, fused alumina experienced a 96 percent permeability reduction and glass beads and silica sand showed greater than a 99 percent reduction.

Density of the individual sintered particles is another important factor in achieving high permeability at high stress conditions. A high density particle is necessary to attain high strength and resist fragmentation under high stress levels. Laboratory tests show that permeability drops off significantly when low density particles are used. For example, at an applied stress of 2000 psi and 315° F, sintered bauxite particles with a specific gravity of 3.7 have a permeability of about 2000 darcies while particles with a specific gravity of 3.2 have a permeability of only 45 darcies. Sizes of both particles were in the 14 to 18 mesh range. Tests on fine sintered bauxite particles (20–24 mesh) having a specific gravity of 3.50 indicated high permeability (627 darcies) under the same test conditions. It is therefore believed that sintered bauxite particles having a specific gravity above about 3.4 make suitable high strength proppants whereas lower density particles would not provide sufficient compressive strength. The data in Table I, however, clearly shows that sintered bauxite particles having specific gravities between 3.50 and about 3.80 (sample 4) possess ample compressive strength for high stress service. The finer mesh size (28–44) of sample 4 provides less permeability than the coarser mesh size (8–12) of sample 5. The preferred range of specific gravity is from about 3.5 to about 3.8, the range of most commercially available sintered bauxite particles. The best results were obtained with particles having a specific gravity of at least about 3.65.

TABLE I

| Sample | Material | Trade Name (Company) | Specific Gravity | Grain Size (Microns) | Proppant Particle Size (mesh) | Applied Stress (psi) | Permeability (Darcies) | | |
|---|---|---|---|---|---|---|---|---|---|
| | | | | | | | 200° F | 250° F | 315° F |
| 1 | Sintered Bauxite | Alundum 75 (Norton Company) | 3.65–3.75 | 25 microns & less | 8–10 | 10,000 | 1700 | — | 800 |
| 2 | Sintered Bauxite | Alundum 75A (Norton Company) | 3.60 | 25 microns & less | 28–44 | 10,000 | — | — | 124 |
| 3 | Sintered Bauxite | E-336 (Norton Company) | 3.50 | 25 microns & less | 20–44 | 10,000 2,000 | — — | — — | 166 627 |
| 4 | Sintered Bauxite | E-336 (Norton Company) | 3.75 | 25 microns & less | 28–44 | 2,000 | — | — | 171 |
| 5 | Sintered Bauxite | S. A. Lionite (General Abrasives Company, Inc.) | 3.75 | Between 4–15 microns (average) | 8–12 | 10,000 | 600 | — | 400 |
| 6 | Sintered Bauxite | Experimental material made by Norton Company | 3.19 | — | 14–18 | 2,000 | — | — | 45 |
| 7 | Fused Alumina | S. S. Lionite (General Abrasives Company, Inc.) | 3.95 | (Coarse) | 8–12 | 10,000 | 90 | — | — |
| 8 | Fused Alumina | MC Lionite | 3.93 | 300 (Average) | 8–12 | 10,000 | 26 | — | — |
| 9 | Silica Sand | | 2.65 | — | 8–12 | 10,000 | 32 | 11 | — |
| 10 | Glass Beads | UCAR Props | 2.65 | — | 8–12 | 6,000 | — | 10 | — |

The drawing presents plots showing permeability at 200° F. at different stress levels for various propping agents tested. As illustrated, the silica sand (sample number 9) performed satisfactorily at low stress levels (3000 psi and lower). At the higher stress levels, the silica sand, (sample 7) fused alumina, (sample 10) and glass beads showed marked reductions in permeability. However, the sintered bauxite material (samples 1 and 5) provided adequate permeability even at stresses up to 10,000 psi and at 315° F. For example, from the drawing it can be calculated that as applied stress increased from 1000 to 10,000 psi, the two sintered bauxite proppants had permeability reductions of 45 percent and 73 percent respectively. Thus the sintered bauxite proppants As mentioned previously, one of the attractive features of the present invention is that it provides a strong, highly permeable proppant which is relatively inexpensive when compared to many of the high strength proppants proposed heretofore. Sintered bauxite is presently commercially available in small quantities at a cost about equal that of high strength glass beads, about ⅔ that of sintered alumina, about ⅓ that of aluminum pellets and about ⅓ that of iron shot (cost per unit volume). When large quantities are made that will be needed for use as proppants, economies of scale should reduce the cost of sintered bauxite appreciably, because the raw material is low cost. In considering the cost of high strength proppants, a valid comparison can be made only as to the proppants that perform satisfactorily at the severe conditions encountered in deep, high temperature formations. The inexpensive proppants such as sand normally cannot be used under these conditions and therefore cannot provide a fair basis for cost comparison. Of the high strength materials that can be used, sintered bauxite proposed by the present invention offers the cheapest proppant material available to date. However, to reduce costs even further the sintered bauxite can be blended with a cheap propping agent, such as sand, to provide a low cost proppant which is significantly stronger than the cheap propping agent but is less costly than pure sintered bauxite proppant. Alternatively, the fracture can first be partially propped with sand and the remainder of the fracture, especially those areas near the wellbore, is then propped with sintered bauxite. The sintered bauxite proppant when used in this manner provides the fracture with sufficient support to prevent excessive fragmentation of the sand.

In carrying out the method of the present invention, the sintered bauxite material may be handled in the same manner as other propping agents. The particulate material in sacks or in bulk form may be delivered to the well site along with other materials used in the fracturing treatment. The method normally will be performed using conventional equipment and techniques.

Following pressure testing of pumping and well equipment, a viscous fluid, frequently referred to as "pad," is injected into the well at a rate and pressure to initiate and propagate a fracture in the formation. The earth stresses are such that the fracture normally is along a vertical plane radiating outwardly from the wellbore in opposite directions. The fracturing fluid may be an oil base, water base, acid, emulsion, foam, or any other fluid. Normally, the fluid contains several additives such as viscosity builders, drag reducers, fluid loss additives, corrosion inhibitors, and the like. Injection of the pad is continued until a fracture of sufficient geometry is obtained to permit the placement of the propping agent particles. Normally the treatment is designed to provide a fracture width at the well-bore of at least 2½ times the diameter of the largest propping agent particle. Once the fracture of the desired geometry is obtained, the propping agent suspended in the fluid is carried and placed in the fracture. The propping agent particles are usually placed in the fracture in a multilayer pattern by maintaining the concentration of the propping agent at from about 0.8 to about 8 pounds per gallon of fracturing fluid. As mentioned previously, the particle size ranges from about 6 to about 80 mesh, with the 10-20 or 20-40 mesh being the most common. Following the placement of the proppant, the well is shut in for a sufficient time to permit the pressure to bleed off into the formation. This causes the fracture to close and exert a closure stress on the propping agent particles. The shut-in period may vary from a few minutes to several days.

When the well is placed on production, hydrocarbons will flow from the formation through the propped fracture and into the well. The closure stress of the fracture walls bearing on the proppants tend to disintegrate the particles, forming fragments which under producing conditions collect and clog or plug interstitial flow passages in the propped fracture, and thereby substantially reduce its permeability. The laboratory test described above indicates that sintered bauxite proppants exhibit far less tendency to fragment than silica sand, glass beads, or other commercially available proppants and thereby provide highly permeable conductive channels in the formation.

FIELD EXAMPLE

A South Texas well producing from a depth of 10,348 feet was fractured by the method of the present invention. About 19,000 pounds of 12-24 mesh sintered bauxite particles, sold by Norton Company as Alundum 75, were injected into the well. The fracturing fluid with the particles suspended therein at a concentration of 1 to 3 pounds per gallon was injected into the well at an average rate of 8 barrels per minute and at a surface pressure of about 9400 psi.

Prior to the fracturing treatment, the well had a stabilized production rate of 1.5 million standard cubic feet of gas per day. Following the treatment, the stabilized production rate was 7.5 million standard cubic feet per day, or a five-fold productivity increase. Estimates indicated that at the stress level present at 10,000 feet, sand would have resulted in substantially less improvement in production rate.

It is believed that the success of this treatment was primarily due to the increased compressive strength of the sintered bauxite particles.

We claim:

1. In a hydraulic fracturing method in which a fluid is injected into a subterranean formation to open a fracture therein, said formation being located at a depth in excess of about 7150 feet, the improvement wherein said fracture is propped with a slightly deformable, high strength propping agent having a permeability to brine at about 200° F which decreases not more than about three-fourths when the applied stress on said propping agent is increased from 1000 to 10,000 psi, said high strength propping agent comprising particles of sintered bauxite having a specific gravity greater than about 3.4, said particles prepared from bauxite material, substantially all of the grains of said bauxite material being about 12 microns or less.

2. The method of claim 1 wherein the particles of sintered bauxite are well rounded.

3. A method as defined in claim 1 wherein said sintered bauxite particles have a mesh size between about 6 and about 80 on the U.S. Standard Sieve Series.

4. A method as defined in claim 1 wherein said sintered bauxite particles have a specific gravity of at least about 3.5.

5. A method as defined in claim 1 wherein said sintered bauxite particles have a specific gravity of from about 3.5 to about 3.8.

6. A method of fracturing a subterranean formation located at a depth in excess of about 7150 feet, which comprises injecting into said formation at a rate and pressure sufficient to open a fracture therein a hydraulic fluid; injecting into said fracture a fluid containing slightly deformable, high strength propping agent particles having a permeability to brine at about 200° F which decreases not more than about three-fourths when the applied stress on said propping agent is increased from 1000 to 10,000 psi, said propping agent particles being composed of sintered bauxite having a specific gravity greater than about 3.4, said sintered bauxite prepared from calcined natural bauxite material having a grain size of about 12 microns or less; and thereafter permitting the fracture to close on said propping agent particles.

7. The method of claim 6 wherein the particles of sintered bauxite are well rounded.

8. A method as defined in claim 6 wherein said particles are made by agglomerating under pressure grains of calcined natural bauxite to form discrete particles of approximate size of propping agent particles, most of said grains being between about 1 and about 12 microns, and thereafter sintering said agglomerated particles at conditions which induce limited grain growth, the final size of most grains being about 25 microns or less.

9. A method as defined in claim 8 wherein the grains of the sintered particle have a grain size between about 8 and about 25 microns.

10. A method as defined in claim 6 wherein said bauxite particles have a specific gravity of at least 3.5.

11. A method as defined in claim 6 wherein said bauxite particles have a specific gravity of from about 3.5 to about 3.8.

12. A method as defined in claim 6 wherein the concentration of said particles in said fluid is sufficient to provide a multilayer propping pattern in said fracture.

13. In a hydraulic fracturing method in which a fluid is injected into a subterranean formation to open a fracture therein, said formation being located at a depth in excess of about 7150 feet, the improvement wherein said fracture is propped with a slightly deformable, high strength propping agent having a permeability to brine at about 200° F which decreases not more than about three-fourths when the applied stress on said propping agent is increased from 1000 to 10,000 psi, said high strength propping agent comprising particles of sintered bauxite having a specific gravity greater than about 3.4, said particles prepared from bauxite material, substantially all of the grains of said bauxite material being about 12 microns or less and having an average grain size of about 4 to about 5 microns.

14. A method of fracturing a subterranean formation located at a depth in excess of about 7150 feet, which comprises injecting into said formation at a rate and pressure sufficient to open a fracture therein a hydraulic fluid; injecting into said fracture a fluid containing slightly deformable, high strength propping agent particles having a permeability to brine at about 200° F which decreases not more than about three-fourths when the applied stress on said propping agent is increased from 1000 to 10,000 psi, said propping agent particles being composed of sintered bauxite having a specific gravity greater than about 3.4, said sintered bauxite prepared from calcined natural bauxite material having a grain size of about 12 microns or less and an average grain size of about 4 to about 5 microns; and thereafter permitting the fracture to close on said propping agent particles.

15. In a hydraulic fracturing method in which a fluid is injected into a subterranean formation to open a fracture therein, said formation being located at a depth in excess of about 7150 feet, the improvement wherein said fracture is propped with a slightly deformable, high strength propping agent having a permeability to brine at about 200° F which decreases not more than about three-fourths when the applied stress on said propping agent is increased from 1000 to 10,000 psi, said high strength propping agent comprising particles of sintered bauxite having a specific gravity greater than about 3.4, said particles prepared from bauxite material having a grain size of about 12 microns or less and an average grain size of about 5 microns or less.

* * * * *